(12) United States Patent
Chen

(10) Patent No.: US 11,929,696 B2
(45) Date of Patent: Mar. 12, 2024

(54) DRIVING AND RESISTANCE CONTROL SYSTEM FOR PERMANENT-MAGNET SYNCHRONOUS MOTOR

(71) Applicant: Yu-Yu Chen, Taipei (TW)

(72) Inventor: Yu-Yu Chen, Taipei (TW)

(*) Notice: Subject to any disclaimer, the term of this patent is extended or adjusted under 35 U.S.C. 154(b) by 174 days.

(21) Appl. No.: 17/662,363

(22) Filed: May 6, 2022

(65) Prior Publication Data
US 2022/0368260 A1 Nov. 17, 2022

(30) Foreign Application Priority Data

May 11, 2021 (TW) ................. 110116843

(51) Int. Cl.
*H02P 25/022* (2016.01)
*A63B 21/22* (2006.01)
(Continued)

(52) U.S. Cl.
CPC .......... *H02P 25/022* (2013.01); *A63B 21/225* (2013.01); *H02K 7/025* (2013.01); *H02K 21/04* (2013.01)

(58) Field of Classification Search
CPC .............. A63B 21/225; A63B 21/0058; A63B 21/0053; A63B 24/0087; A63B 2024/0093; A63B 21/0054; A63B 2220/58; A63B 22/0076; A63B 2220/51; A63B 21/012; A63B 24/00; A63B 21/00076; A63B 21/00181; A63B 21/0059; A63B 2220/13; A63B 2220/40; A63B 21/00178; A63B 21/00058; A63B 21/00; A63B 2220/10; A63B 2220/80; H02P 25/022; H02P 2207/05; H02P 2207/055; H02P 1/24; H02P 1/18; H02P 1/42; H02P 1/46; H02P 3/12; H02P 3/22; H02P 6/32; H02P 7/29; H02P 23/20; H02P 25/064; H02P 25/024;
(Continued)

(56) References Cited

U.S. PATENT DOCUMENTS

2019/0070448 A1* 3/2019 Jeremic .............. A63B 21/0059

* cited by examiner

*Primary Examiner* — Antony M Paul
(74) *Attorney, Agent, or Firm* — Chun-Ming Shih; HDLS IPR SERVICES

(57) ABSTRACT

A driving and resistance control system for a permanent-magnet synchronous motor is disclosed. A control device includes a processing unit, a motor driving circuit, a resistance controller, and an interlock switch. In a first operation mode, the interlock switch makes the motor driving circuit and the permanent-magnet synchronous motor open-circuiting, and connecting stator windings of the permanent-magnet synchronous motor to the resistance controller, and under this condition, the external rotor of the permanent-magnet synchronous motor is rotated by spinning of a flywheel, so that the permanent-magnet synchronous motor is operating in a generator mode to generate a resisting force to the flywheel by mesas of a resistance generation device. In a second operation mode, the interlock switch makes the motor driving circuit and the permanent-magnet synchronous motor closed-circuiting and cutting off control of the resistance controller, and electrical energy is supplied from the power supply circuit to the permanent-magnet synchronous motor, so as to make the permanent-magnet synchronous motor operating in a motor mode to induce an acceleration on the external rotor.

20 Claims, 14 Drawing Sheets

(51) Int. Cl.
*H02K 7/02* (2006.01)
*H02K 21/04* (2006.01)

(58) Field of Classification Search
CPC ...... H02P 25/062; H02P 25/18; H02P 25/107;
H02P 27/08; H02P 27/06; H02P 29/662;
H02P 5/00; H02P 7/025; H02K 21/04;
B62M 3/00
See application file for complete search history.

DRIVING AND RESISTANCE CONTROL SYSTEM FOR PERMANENT-MAGNET SYNCHRONOUS MOTOR

BACKGROUND OF THE INVENTION

1. Field of the Invention

The present invention relates to a control system for an exercise equipment, and more particularly to a driving and resistance control system for permanent-magnet synchronous motors.

2. The Related Arts

Energy saving and carbon reduction, environmental friendliness, safety, and easy maintenance are, among the other, the best advantages of bicycles. It is reported that the penetration rate of electrical bicycles is increasingly growing. Particularly, in a period of global epidemic prevention, the bicycles are the most important tools for people for exercise, fitness, entertainment, and social activities.

Besides the bicycles for outdoor uses, indoor exercise bicycles are even a more important tool for exercise in the modern busy society. In a known design of an indoor exercise bicycle or a stationary bicycle, to provide additional riding fun and versatileness for an exerciser, an arrangement for controlling driving and resistance is commonly provided. In an application of virtual reality, an arrangement for driving and resistance control is an essential function.

However, there are a number of shortcomings of a known exercise equipment in respect of driving and resistance control of a motor:

(1) Coils of electromagnetic windings of a driving system and a resistance system of a known motor are arranged on a common stator, so that it is hard to dissipate heat.

(2) Coils of electromagnetic windings of a driving system and a resistance system of a known motor are arranged on a common stator, so that inertia may impose constraints to an arrangement of a rotator flywheel.

(3) Coils of electromagnetic windings of a driving system and a resistance system of a known motor are arranged on a common stator, so that resistance control becomes relatively complicated and hard to adjust and vary.

(4) Coils of electromagnetic windings of a driving system and a resistance system of a known motor are arranged on a common stator, so that a high temperature generated by the resistance control system will affect a magnetic field intensity of a permanent magnet on a rotor.

(5) Coils of electromagnetic windings of a driving system and a resistance system of a known motor are arranged on a common stator, so that in case of being switched to the motor resistance system, electricity generated due to work done by a user doing riding can only be released through an electrical resistor and cannot be accumulated through backward charging for energy storage, making it no value for environmental protection.

(6) Coils of electromagnetic windings of a driving system and a resistance system of a motor are arranged on a common stator, so that a resistance generated by an electromagnetic field is readily affected by temperatures to reduce an efficiency thereof.

(7) For a structure of a permanent-magnet synchronous motor driving system of a known exercise bicycle, when operating in a generator mode, a generated voltage discharges energy directly to an electrical resistor or a power switch (which can be either an IGBT or a MOSFET), so that an extremely high temperature will be generated and an additional arrangement of a cooling device or a heat-dissipating fan is necessary, resulting in a high level noise and being environmentally unfriendly.

SUMMARY OF THE INVENTION

Thus, the main purpose of the present invention is to provide a driving and resistance control system of a permanent-magnet synchronous motor, which helps alleviate the shortcomings of the known exercise equipment resistance systems.

A technical solution adopted in the present invention comprises an electromagnetic resistance generation device arranged adjacent to an external rotor of a permanent-magnet synchronous motor. A control device comprises a processing unit, a motor driving circuit, a resistance controller, and an interlock switch. In a first operation mode, the interlock switch makes the motor driving circuit and the permanent-magnet synchronous motor open-circuiting, and connecting stator windings of the permanent-magnet synchronous motor to the resistance controller, and under this condition, the external rotor of the permanent-magnet synchronous motor is rotated by spinning of a flywheel due to pedaling of an operator, so as to make the permanent-magnet synchronous motor operating in a generator mode, in a second operation mode, the interlock switch makes the motor driving circuit and the permanent-magnet synchronous motor closed-circuiting and cutting off control of the resistance controller, and electrical energy is supplied from the power supply circuit to the permanent-magnet synchronous motor, so as to make the permanent-magnet synchronous motor operating in a motor mode to induce an acceleration on the external rotor.

An alternative embodiment of the present invention comprises a resistance generation device for generating a resisting force to the flywheel of the exercise equipment. At least one electricity generation winding is wound onto the stator, and a charging circuit is connected to the at least one electricity generation winding through a second rectifier and filter circuit and connected to the plurality of stator windings through the resistance controller. In a first operation mode, the interlock switch makes the motor driving circuit and the permanent-magnet synchronous motor open-circuiting, and makes the stator windings of the permanent-magnet synchronous motor connected to the resistance controller. Under such a condition, the external rotor of the permanent-magnet synchronous motor is caused to rotate by an operator of the exercise equipment applying a force to cause spinning of the flywheel, so that the permanent-magnet synchronous motor is operating in a generator mode to make the plurality of stator windings generate a generation voltage fed to the resistance controller, and the resistance controller controls the resistance generation device to generate the resisting force to the flywheel according to a pulse width modulation (PWM) control signal; wherein the generation voltage generated by the plurality of stator windings charges into the energy storage device through the resistance controller and the charging circuit during the first operation mode, and also a backward charging voltage generated by the at least one electricity generation winding charges into the energy storage device through the second rectifier and filter circuit and the charging circuit during the first operation mode. In a second operation mode, the interlock switch makes the motor driving circuit and the permanent-magnet synchronous motor closed-circuiting, and cutting off control of the resistance controller, and an electrical energy stored in the energy storage device is supplied to the permanent-magnet synchronous motor through the motor driving circuit, so as to make the permanent-magnet synchronous motor operating in a motor mode to drive the external rotor of the permanent-magnet synchronous motor; and wherein a backward charging voltage generated by the at least one electricity generation winding charges into the energy storage device through the second rectifier and filter circuit and the charging circuit during the second operation mode.

A further alternative embodiment of the present invention comprises a resistance generation device for generating a resisting force to the flywheel of the exercise equipment. The resistance generation device is provided with a discharge power element and a discharge resistor serially connected to the discharge power element. A resistance controller connected between the plurality of stator windings of the permanent-magnet synchronous motor and the resistance generation device. The resistance controller is provided with a first rectifier and filter and a PWM control circuit connected between the first rectifier and filter and the discharge power element of the resistance generation device. An interlock control is used to control the operation of the motor driving circuit and the PWM control circuit of the resistance controller. In a first operation mode, under control of the interlock control of the control device, the processing unit generates a first PWM control signal to the PWM control circuit of the resistance controller to control the discharge power element, while disables sending of a second PWM control signal to the motor driving circuit. Under such an operation mode, the external rotor of the permanent-magnet synchronous motor is rotated by a cycling motion generated by the operator pedaling the flywheel to move, so that the permanent-magnet synchronous motor is operating in a generator mode to generate an AC generation voltage at the stator winding, wherein the generation voltage is fed to the resistance controller and converted into a DC voltage by means of the first rectifier and filter circuit, and then the DC voltage is applied through the discharge resistor to generate an enlarged current to thereby change a resisting force applied to the flywheel. In a second operation mode, under control of the interlock control of the control device, the processing unit of the control device generates the second PWM control signal to the motor driving circuit to control the motor driving circuit, while disables sending of the first PWM control signal to the PWM control circuit 642. Under such an operation mode, the electrical energy is supplied from the power supply circuit, and the motor driving circuit supplies a driving current for the permanent-magnet synchronous motor under control of the second PWM control signal, so that the permanent-magnet synchronous motor is operating in a motor mode to generate an acceleration on the external rotor of the permanent-magnet synchronous motor.

Concerning efficacy, the present invention possesses the advantage of motor driving, and the permanent-magnet synchronous motor of the present invention, when operating in a generator mode, possesses excellently smoothening variation of a magnitude of a resisting force. Further, the work that the operator makes during a riding exercise may be charged backward for storage of energy.

Further, when the permanent-magnet synchronous motor of the present invention in operating in the generator mode, the resistance system includes an arrangement of an electromagnetic resistance generation device arranged on a periphery of the external rotor of the permanent-magnet synchronous motor in operation, and the electromagnetic field intensity of the electromagnetic resistance generation device causes a damping effect on the rotor, without causing mutual interference with an internal structure of the permanent-magnet synchronous motor, including the stator windings and the permanent-magnet external rotor.

The present invention provides the following advantages:
(1) The permanent-magnet synchronous motor driving and resistance control system of the present invention is provided so as to include, for stator windings, winding for motor driving, and also a winding for electricity generation by a generator to provide electrical energy to the resistance system.
(2) The permanent-magnet synchronous motor driving and resistance control system of the present invention is provided such that the permanent magnet of the permanent-magnet external rotor provides a function of motor driving, and when serving as a generator, the rotor magnet and the stator windings move relative to each other to generate electricity, this being a unique arrangement.
(3) The permanent-magnet synchronous motor driving and resistance control system of the present invention is provided as a high-efficiency accurate driving arrangement.
(4) The permanent-magnet synchronous motor driving and resistance control system of the present invention is provided to include a resistance system of high efficiency and accuracy.
(5) The permanent-magnet synchronous motor driving and resistance control system of the present invention is provided such that the resistance generation device is arranged on an outer circumference of the rotor and its temperature does not affect the motor windings and the permanent magnet of the rotor.
(6) The permanent-magnet synchronous motor driving and resistance control system of the present invention is provided such that the resistance generation device is arranged on an outer circumference of the rotor for concerning about temperature variation of the flywheel rotor and the main body, making heat easily dissipated.
(7) The permanent-magnet synchronous motor driving and resistance control system of the present invention is provided such that the work done by the riding operation of an operator can provide a damping effect to the resistance generation device and can also be backward charged for energy storage, ensuring a value of environmental protection.
(8) The permanent-magnet synchronous motor driving and resistance control system of the present invention has high accuracy and is easy to manufacture.
(9) The permanent-magnet synchronous motor driving and resistance control system of the present invention is environmentally friendly and saves energy.
(10) The permanent-magnet synchronous motor driving and resistance control system of the present invention has excellent inertia and high accuracy, allowing an operator to do exercise in a more efficient way.

A specific technical adopted in the present invention will be further described with reference to the embodiments provided below and the attached drawings.

DETAILED DESCRIPTION OF THE PREFERRED EMBODIMENTS

Figure 1A:
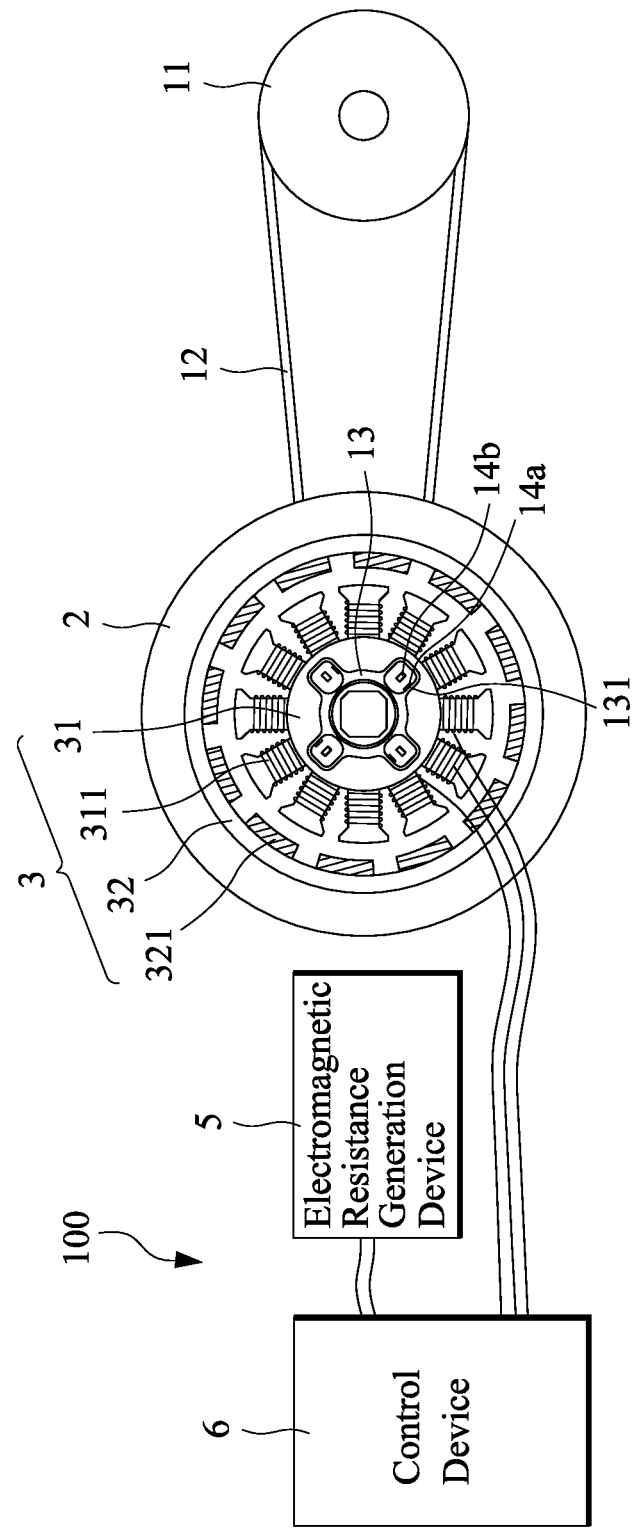
FIG. 1A is a schematic view showing combination of a permanent-magnet synchronous motor with a flywheel of an exercise equipment according to the present invention.

Referring to FIG. 1A, which is a schematic view showing a permanent-magnet synchronous motor driving and resistance control system 100 according to the present invention combining a permanent-magnet synchronous motor with a flywheel of 1 of an exercise equipment such as a bicycle, as shown in the drawing, when an external force (such as pedaling conducted by an operator of the exercise bicycle) is applied to a driving wheel 11, the external force drives, via a transmission device 12, the flywheel 2 to rotate. The transmission device 12 can be a belt, a chain, or gears. In a practical application, the external force may be directly applied to the flywheel 2, without being applied by way of the driving wheel 11 and the transmission device 12.

A permanent-magnet synchronous motor 3 comprises a stator 31 and an external rotor 32, wherein the stator 31 includes a plurality of stator windings 311, and the plurality of stator windings 311 can be one of a distributed winding arrangement or a concentrated winding arrangement. Based on structure, winding arrangement, and magnet shape of the stator, the permanent-magnet synchronous motor 3 may generate two types of counter electromotive forces (EMFs), which are sine wave and trapezoidal wave. A permanent-magnet synchronous motor adopting sine wave counter EMF is generally preferably driven by a sine-wave current in order to exhibit smooth output torque and improved performance. For trapezoidal wave counter EMF, driving with square-wave current is adopted so that even though an enlarged torque pulse may be induced in phase switching, yet advantages of simple control and low cost, making it suitable for speed control for an indoor exercise bicycle or a rehabilitation vehicle (Rehab).

The external rotor 32 is circumferentially provided with a plurality of permanent magnet units 321 to generate a high-flux magnetic field. Arrangement of each of the permanent magnet units 321 may be selected to be surface-mounted or internally concealed. The external rotor 32 is combined with the flywheel 2, so that the operator, when operating the exercise bicycle to conduct a pedaling motion, may make the flywheel 2 rotating by means of the driving wheel 11 and the transmission device 12, so as to cause the external rotor 32 of the permanent-magnet synchronous motor 3 to rotate.

The permanent-magnet synchronous motor driving and resistance control system 100 according to the present invention is applicable to controlling of rotational speed/torque/resistance for the permanent-magnet synchronous motor 3 or driving of the permanent-magnet synchronous motor 3 to simulate a feeling of virtual reality for uphill and downhill operations.

The permanent-magnet synchronous motor 3 may be provided with a sensor support 13 combined therewith, and multiple stress sensor units 14a, 14b are provided at selected locations on a flange 131 of the sensor support 13 (such as a sidewall of an internal space, or a surface, or the flange 131) to measure watt-torque data of force application for an operator conducting a pedaling motion.

Figure 1B:
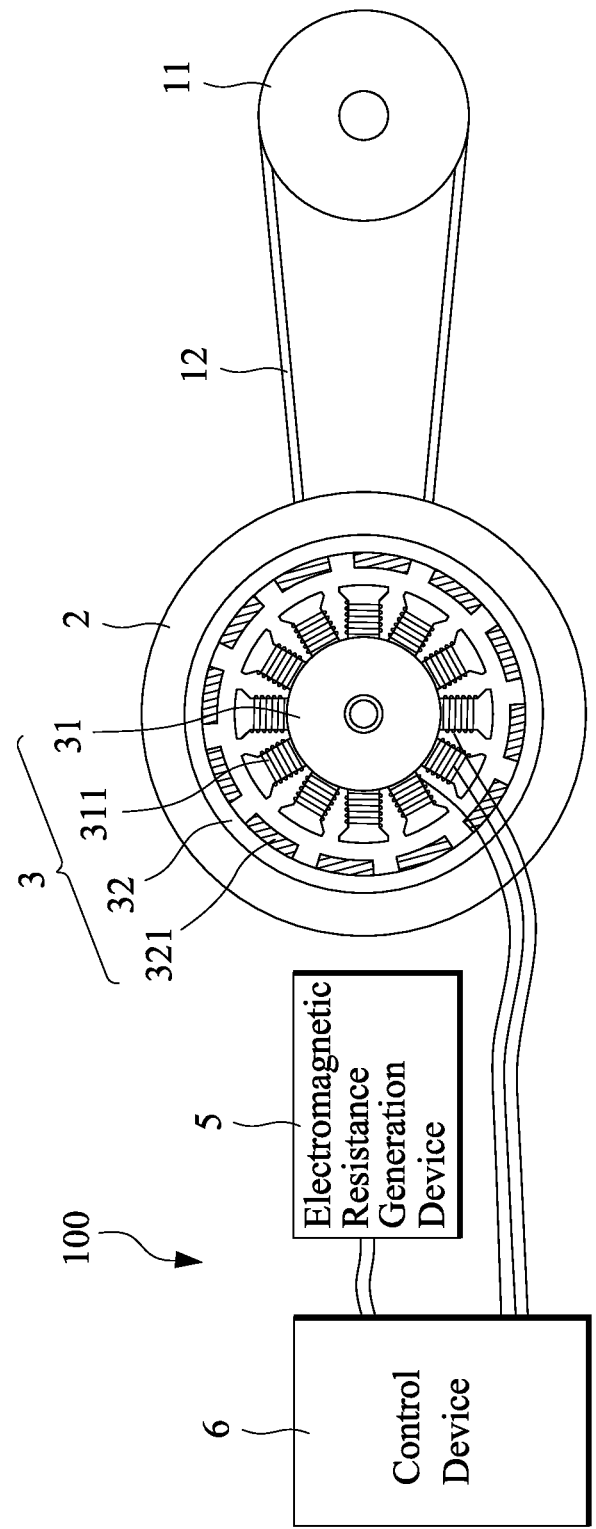
FIG. 1B is a schematic view similar to FIG. 1A with a sensor support removed.

FIG. 1B is a schematic view illustrating that shown in FIG. 1A with the sensor support 13 removed.

Figure 2:
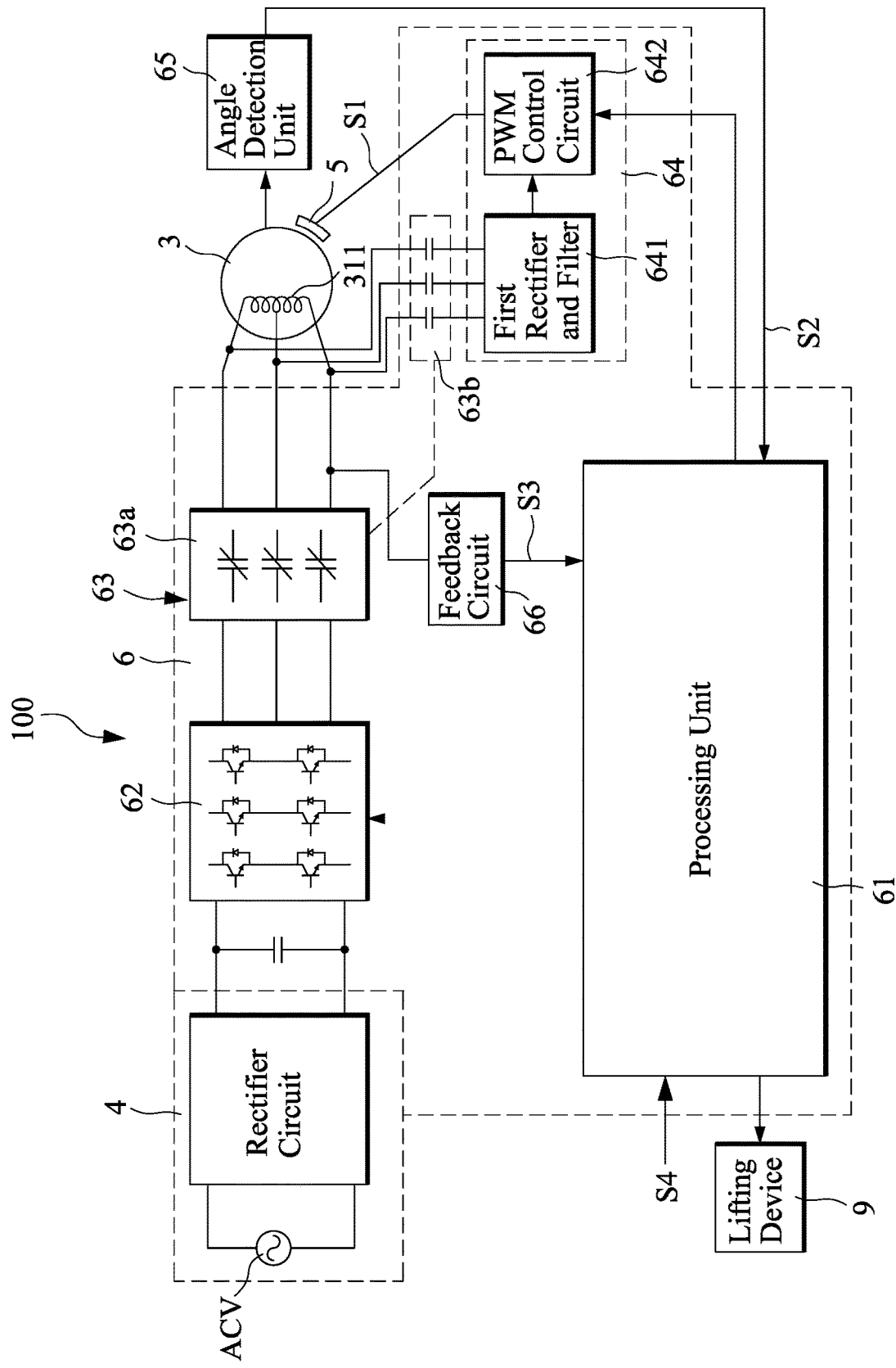
FIG. 2 is a circuit diagram of a first embodiment according to the present invention for use with the implementing example shown in FIG. 1A or 1B.

Referring to FIG. 2, which is a circuit diagram of a first embodiment according to the present invention for use with the implementing example shown in FIG. 1A or 1B, the permanent-magnet synchronous motor driving and resistance control system 100 of the instant embodiment comprises a power supply circuit 4, which comprises a rectifier circuit that supplies electrical energy to the permanent-magnet synchronous motor driving and resistance control system 100. The power supply circuit 4 is connectable with an AC power supply (ACV), an energy storage device (to be described hereinafter) or a combined power supply made up of an AC alternate-current power supply (ACV) and an energy storage device.

An electromagnetic resistance generation device 5 is arranged adjacent to an outer circumference of the external rotor 32 of the permanent-magnet synchronous motor 3. The electromagnetic resistance generation device 5 is formed of an electrical magnet.

A control device 6 is electrically connected with the permanent-magnet synchronous motor 3 and the electromagnetic resistance generation device 5. The control device 6 comprises a processing unit 61, a motor driving circuit 62, an interlock switch 63, and a resistance controller 64, in which the motor driving circuit 62 is electrically connected with the power supply circuit 4 and the stator windings 311 of the permanent-magnet synchronous motor 3 for driving the permanent-magnet synchronous motor 3. The motor driving circuit 62 is provided therein with a power switch of a frequency convener. The interlock switch 63 includes a first switch 63a connected between the motor driving circuit 62 and the stator windings 311 of the permanent-magnet synchronous motor 3, and a second switch 63b connected between the stator windings 311 and the resistance controller 64.

The resistance controller 64 is connected with the plurality of stator windings 311 of the permanent-magnet synchronous motor 3 and the electromagnetic resistance generation device 5. The resistance controller 64 comprises a first rectifier and filter circuit 641 and a pulse width modulation (PWM) control circuit 642. The first rectifier and filter circuit 641 is connected with the stator windings 311 of the permanent-magnet synchronous motor 3. The PWM control circuit 642 is connected with the first rectifier and filter circuit 641 and the electromagnetic resistance generation device 5. According to a DC voltage generated by the first rectifier and filter circuit 641, the PWM control circuit 642 generates a PWM control signal S1 to control an electromagnetic field intensity of the electromagnetic resistance generation device 5.

The control device 6 further comprises an angle detection unit 65, which detects an angle of a rotating spindle of the permanent-magnet synchronous motor 3 and generates an angle signal S2 to the processing unit 61. The angle detection unit 65 can be an encoder. By means of the angle detection unit 65, a rotor angular position of the permanent-magnet synchronous motor 3 can be identified to accurately generate a stator exciting field for generating an effective torque.

The control device 6 further comprises a feedback circuit 66, which can be for example a current feedback circuit that generates a current signal S3 to the processing unit 61. The processing unit 61 integrates the signals from the angle detection unit 65 and the feedback circuit 66 to conduct control of switching to the power switch of the frequency converter included in the motor driving circuit 62 to achieve control of rotational speed/torque.

The processing unit 61 of the control device 6 receives an instruction signal S4 for controlling the permanent-magnet synchronous motor 3 to operate in an uphill simulation mode or a downhill simulation mode, so that the exercise bicycle operator may enjoy a variety of road conditions through virtual reality for resembling situations of being located outdoors. To use, the processing unit 61 of the control device 6 may be connected with a lifting device 9, and the lifting device 9 is combined with the exercise bicycle, so that the processing unit 61 of the control device 6 may perform control over the lifting device 9 to drive the exercise device to oscillate for simulating scenarios of moving uphill or downhill.

In the uphill simulation mode (a first operation mode), the first switch 63a of the interlock switch 63 makes the stator windings 311 of the motor driving circuit 62 and the permanent-magnet synchronous motor 3 open-circuiting, and the second switch 63b of the interlock switch 63 makes the stator windings 311 of the permanent-magnet synchronous motor 3 and the resistance controller 64 closed-circuiting. Under such a condition, the external rotor 32 of the permanent-magnet synchronous motor 3 is rotated by a cycling motion generated by the operator pedaling the flywheel 2 to move, so that the permanent-magnet synchronous motor 3 is operating in a generator mode to generate an AC generation voltage that is fed to the resistance controller 64. The first rectifier and filter circuit 641 of the resistance controller 64 converts the generation voltage into a DC voltage, and then, the PWM control circuit 642 generates the PWM control signal S1 to control the electromagnetic field intensity of the electromagnetic resistance generation device 5 for applying a resisting force to the external rotor 32. As such, the magnitude of a resisting force applied to the flywheel 2 can be changed. Thus, a virtual reality feeling of simulating an uphill motion is generated.

In the downhill simulation mode (a second operation mode), the first switch 63a of the interlock switch 63 makes the stator windings 311 of the motor driving circuit 62 and the permanent-magnet synchronous motor 3 closed-circuiting, and the second switch 63b of the interlock switch 63 makes the stator windings 311 of the permanent-magnet synchronous motor 3 and the resistance controller 64 open-circuiting. Under such a condition, electrical energy is supplied from the power supply circuit 4, and the motor driving circuit 62 supplies a driving current for the permanent-magnet synchronous motor 3, so that the permanent-magnet synchronous motor 3 is operating in a motor mode to generate an acceleration on the external rotor 32. Thus, a virtual reality feeling of simulating a downhill motion is generated.

Figure 3:
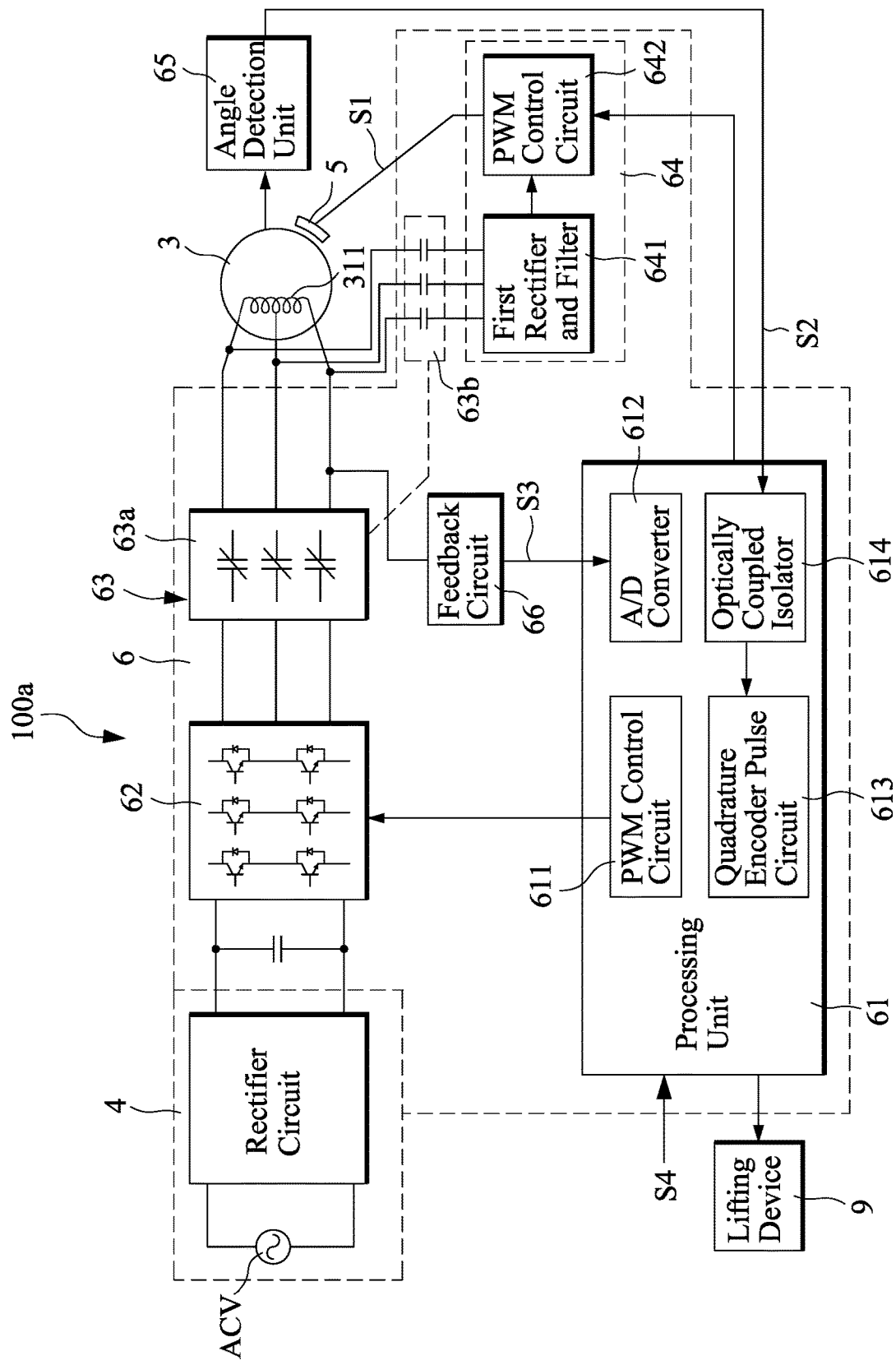
FIG. 3 is a circuit diagram of a second embodiment according to the present invention for use with the implementing example shown in FIG. 1A or 1B.

Referring to FIG. 3, which is a circuit diagram of a second embodiment according to the present invention for use with the implementing example shown in FIG. 1A or 1B, in the permanent-magnet synchronous motor driving and resistance control system 100a of the instant embodiment, constituent components are generally similar to those of the first embodiment, so that, for consistency purpose, identical elements are designated with the same reference numerals. In the instant embodiment, the processing unit 61 of the control device 6 is internally built up with a PWM control circuit 611 that controls the motor driving circuit 62, and an A/D converter 612 that receives the feedback signal from the feedback circuit 66. The feedback circuit 66 may comprise one of a current feedback circuit, a voltage feedback circuit, a Hall component, and a temperature component. The processing unit 61 of the control device 6 may further be built therein with a quadrature encoder pulse circuit 613, which is connected, via an optically coupled isolator 614, to the angle detection unit 65 to detect an angle of a rotating spindle of the permanent-magnet synchronous motor 3.

Figure 4:
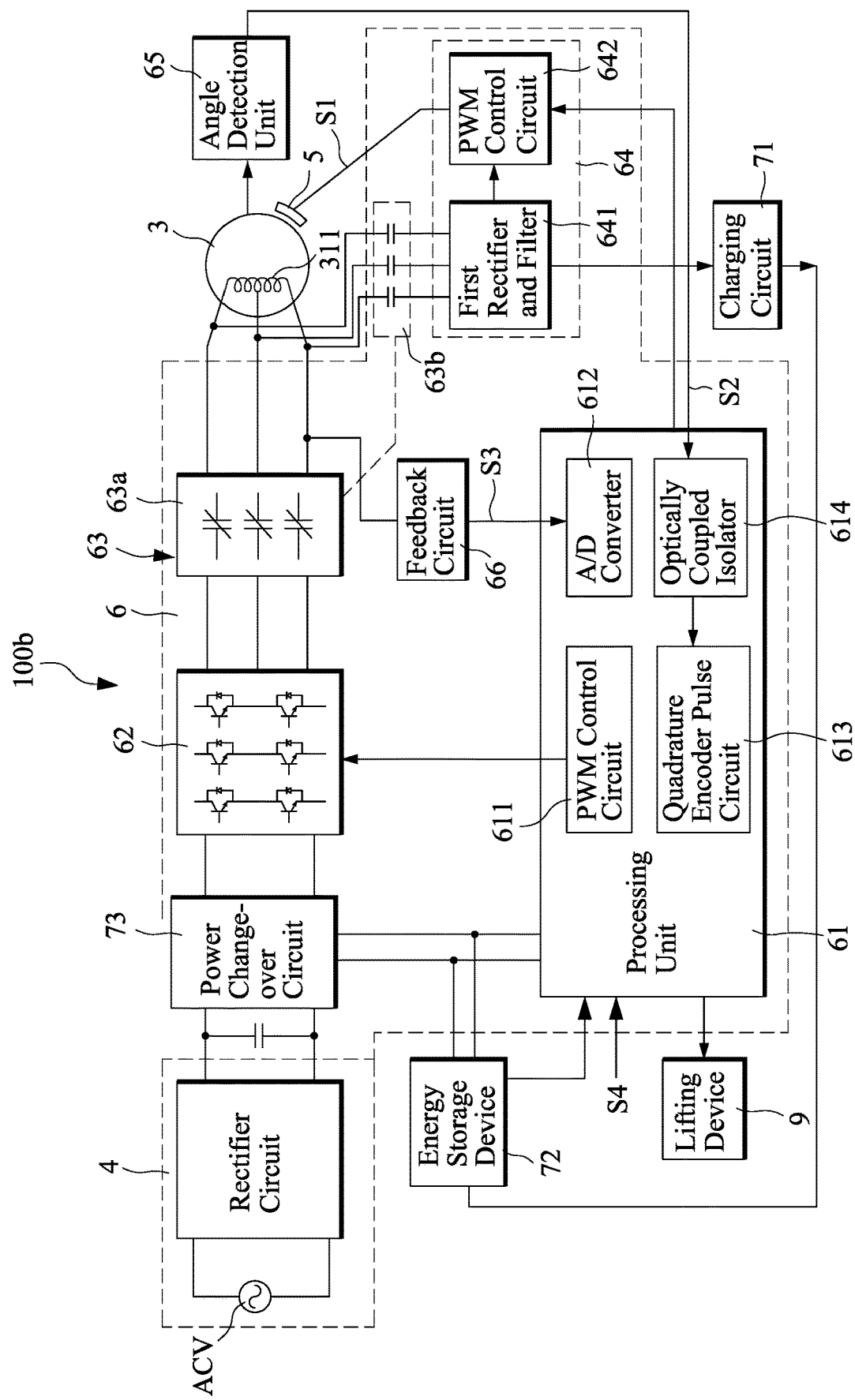
FIG. 4 is a circuit diagram of a third embodiment according to the present invention for use with the implementing example shown in FIG. 1A or 1B.

Referring to FIG. 4, which is a circuit diagram of a third embodiment according to the present invention for use with the implementing example shown in FIG. 1A or 1B, in the permanent-magnet synchronous motor driving and resistance control system 100b of the instant embodiment, constituent components are generally similar to those of the second embodiment, so that, for consistency purpose, identical elements are designated with the same reference numerals. The instant embodiment further includes a charging circuit 71 that is connected to the first rectifier and filter circuit 641 and an energy storage device 72. When an operator does exercise by riding the exercise bicycle to generate cycling or spinning that drives the flywheel to rotate so as to set the permanent-magnet synchronous motor 3 to operate in the generator mode that generates an AC generation voltage. The AC generation voltage, in addition to serving as electrical energy necessarily supplied to the resistance controller 64, provides an extra amount of energy, which requires to be released, to be fed through the charging circuit 71 for backward charging to the energy storage device 72.

A power changeover circuit 73 is connected to the energy storage device 72 and the power supply circuit 4 for selectively switching from the energy storage device 72 or the alternate-current power supply (ACV) to the permanent-magnet synchronous motor 3 for supply of electrical energy for operation. Electrical energy from the energy storage device 72 can be used to take the place of the alternate-current power supply (ACV) to directly supply to the motor with electrical energy necessary thereto.

Figure 5:
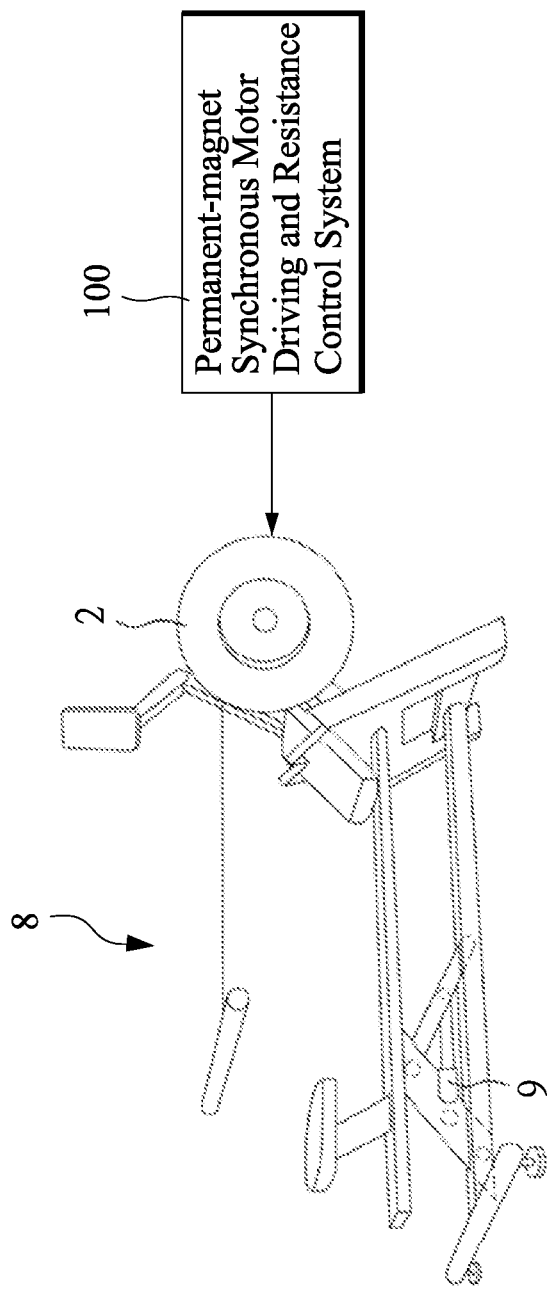
FIG. 5 is a schematic view illustrating an application in which the present invention is combined with a rowing machine.

The present invention is combinable with various exercise equipment. For example, FIG. 5 is a schematic view illustrating the present invention combined with a rowing machine 8. When an operator pulls a puller of the rowing machine, the flywheel 2 is driven to rotate, and a lifting device 9 that is arranged in a chassis of the rowing machine is controlled by the processing unit 61 to drive the rowing machine 8 to oscillate for exhibiting uphill or downhill to thereby generate simulation for a slope. Under the control of the permanent-magnet synchronous motor driving and resistance control system 100 (or 100a and 100b) according to the present invention, the permanent-magnet synchronous motor that is coupled to the flywheel 2 may be operated in the first operation mode or the second operation mode.

Figure 6:
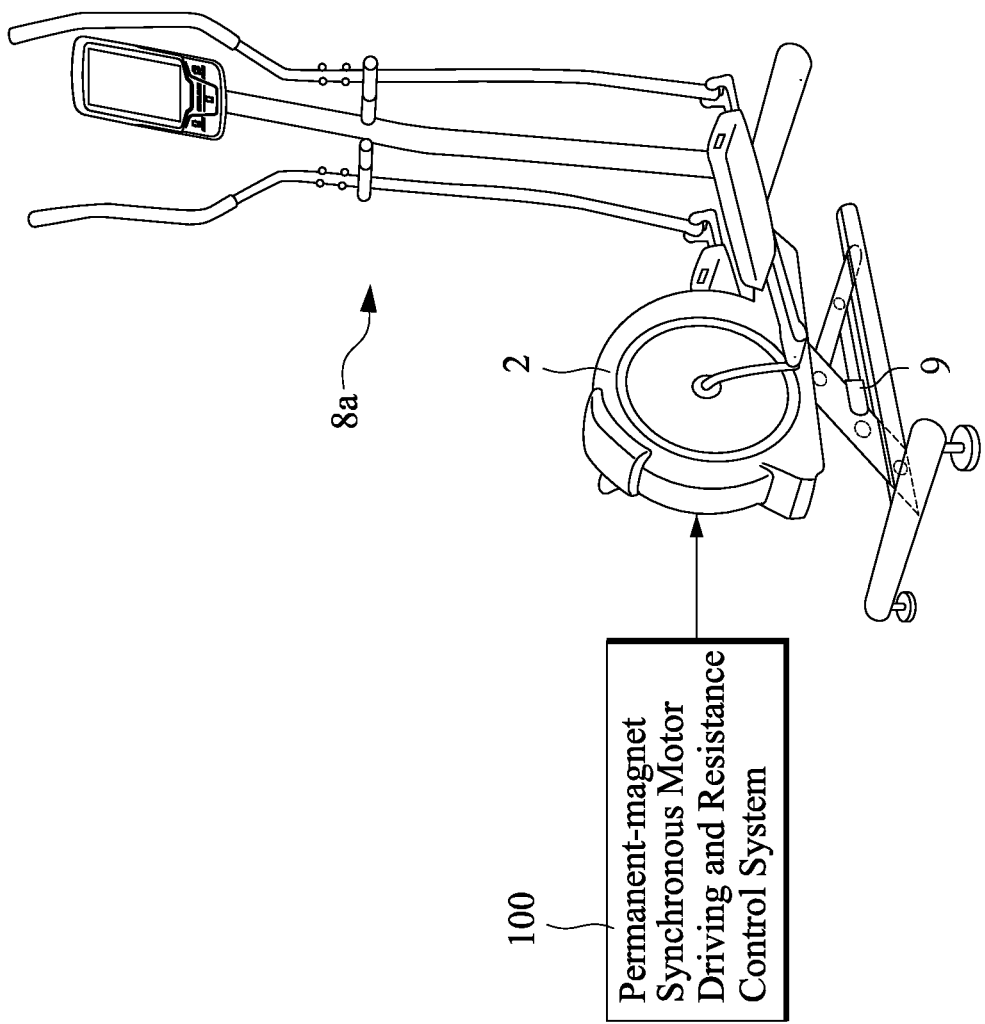
FIG. 6 is a schematic view illustrating an application in which the present invention is combined with an elliptical machine.

FIG. 6 is a schematic view illustrating an application in which the present invention is combined with an elliptical trainer 8a. When the operator treads pedals of the elliptical trainer 8a, the flywheel 2 is driven to rotate, and a lifting device 9 that is arranged in a chassis of the elliptical trainer 8a is controlled by the processing unit 61 to drive the elliptical trainer 8 to oscillate for exhibiting uphill or downhill to thereby generate simulation for a slope. Under the control of the permanent-magnet synchronous motor driving and resistance control system 100 (or 100a and 100b) according to the present invention, the permanent-magnet synchronous motor 3 may be operated in the first operation mode or the second operation mode.

Figure 7:
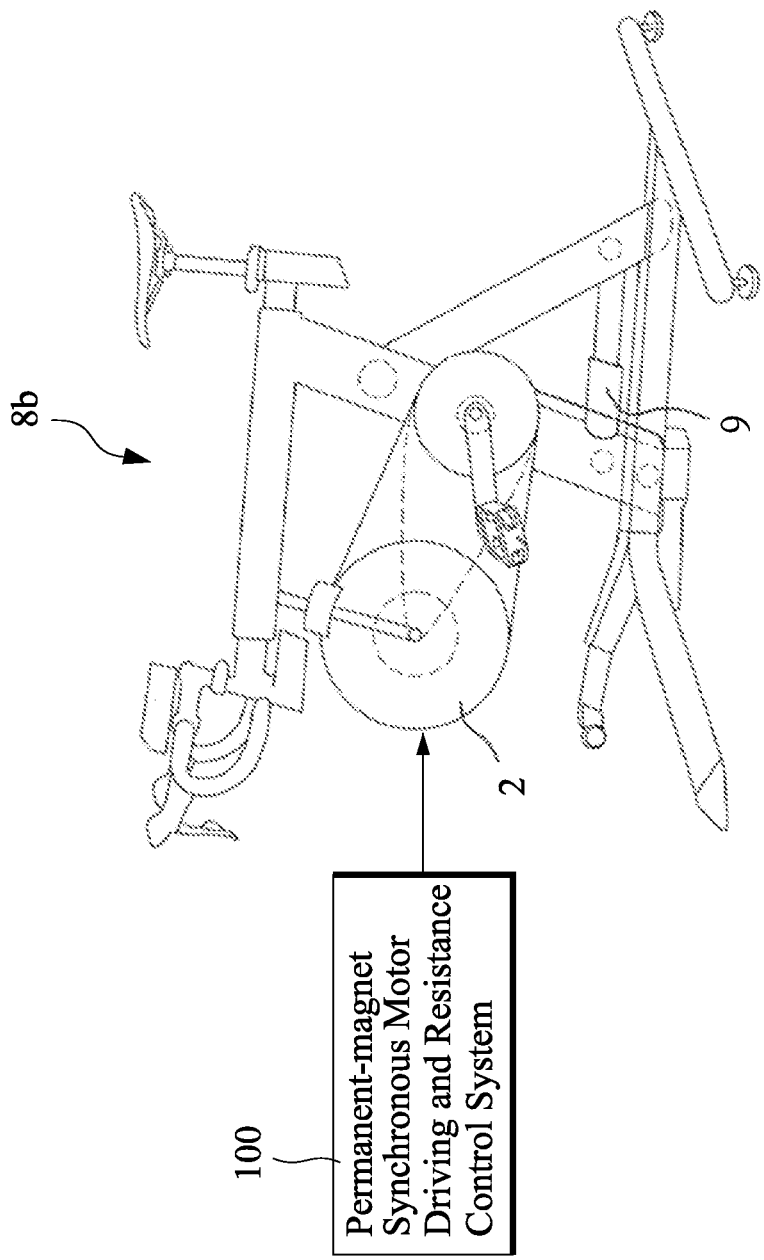
FIG. 7 is a schematic view illustrating an application in which the present invention is combined with a spinning exerciser.

FIG. 7 is a schematic view illustrating an application in which the present invention is combined with a spinner bike 8b. When the operator treads pedals of the spinner bike 8b, the flywheel 2 is driven to rotate, and a lifting device 9 that is arranged in a chassis of the spinner bike 8b is controlled by the processing unit 61 to drive the spinner bike 8b to oscillate for exhibiting uphill or downhill to thereby generate simulation for a slope. Under the control of the permanent-magnet synchronous motor driving and resistance control system 100 (or 100a and 100b) according to the present invention, the permanent-magnet synchronous motor 3 may be operated in the first operation mode or the second operation mode. The spinner bike 8b of this application may be replaced by a known bicycle trainer.

Figure 8A:
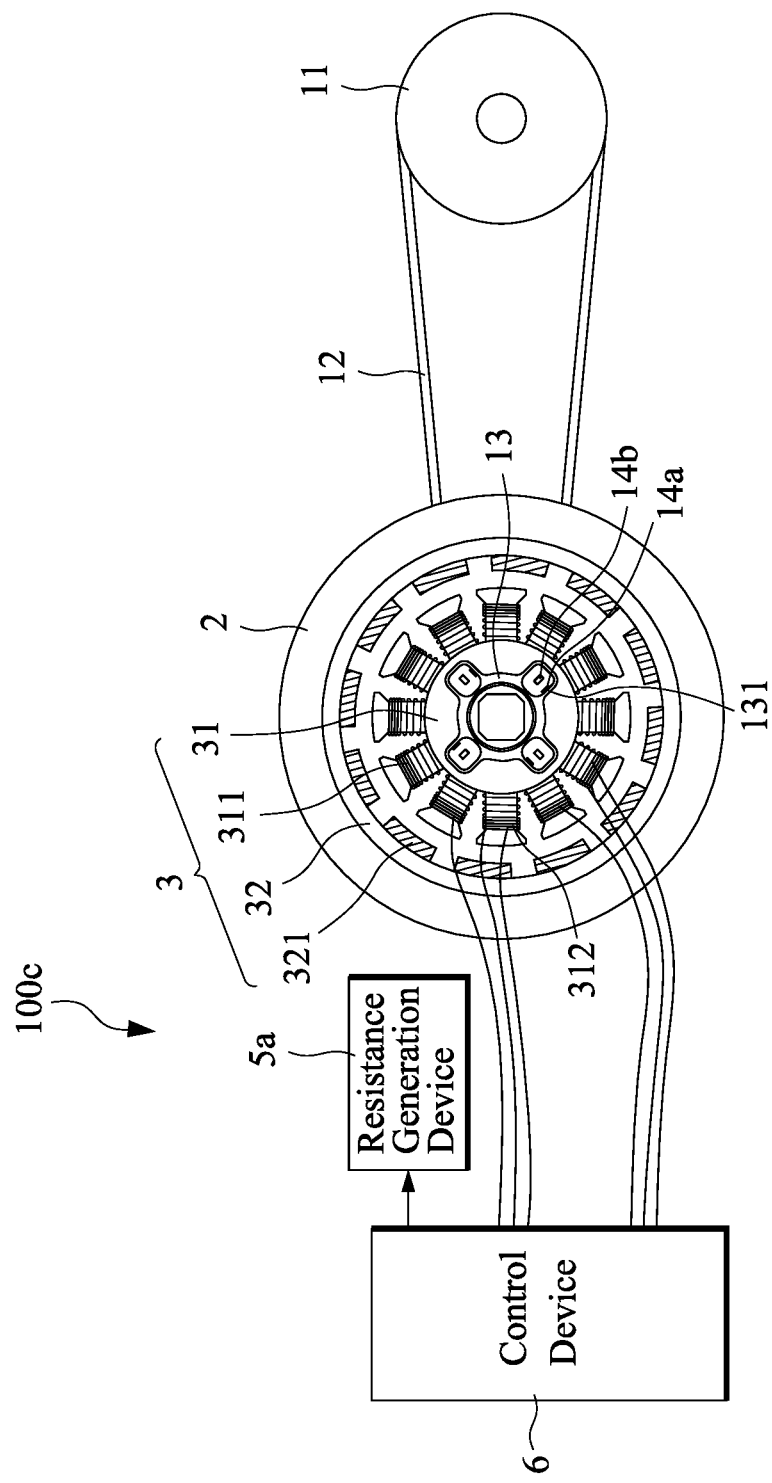
FIG. 8A is a schematic view showing a substitute example of combination of a permanent-magnet synchronous motor with a flywheel of an exercise equipment according to the present invention.
Figure 8B:
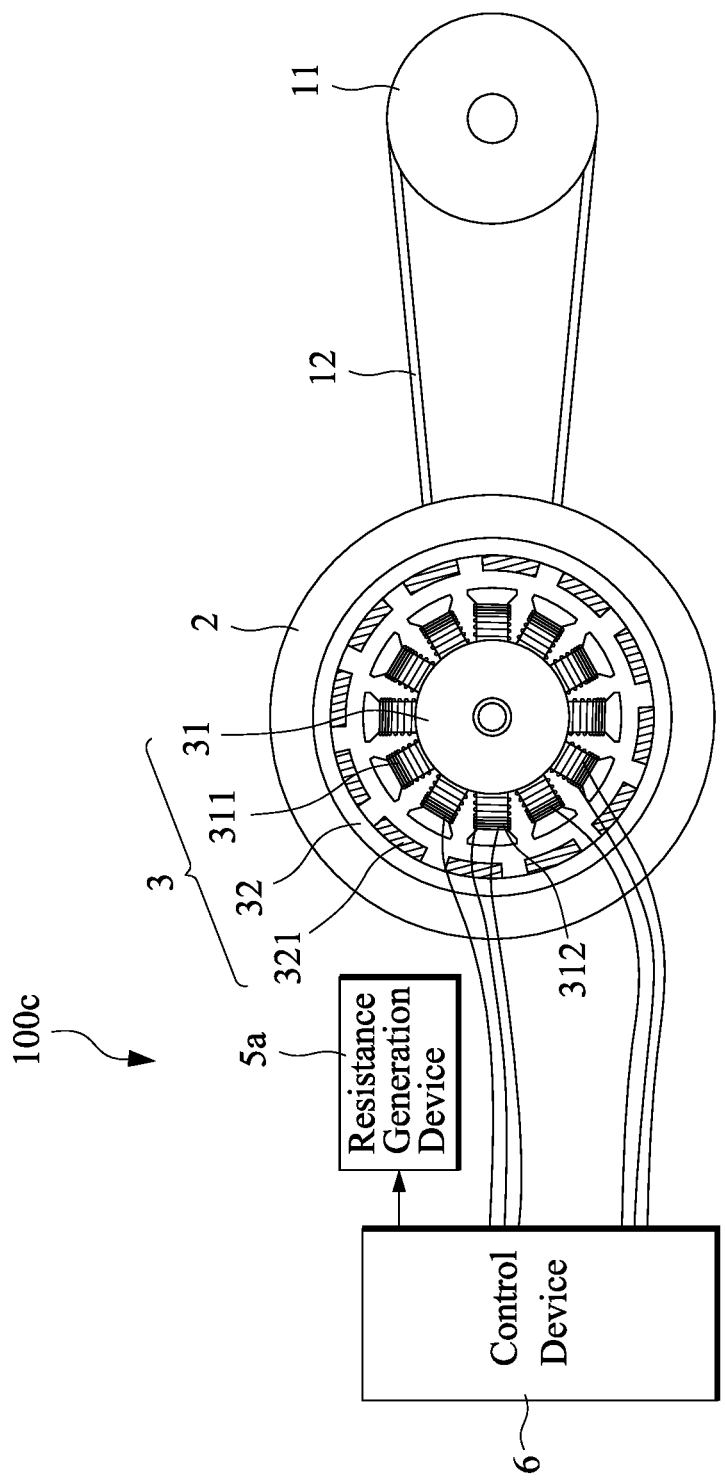
FIG. 8B is a schematic view similar to FIG. 8A with a sensor support removed.

FIG. 8A is a schematic view showing a substitute example of the present invention combining a permanent-magnet synchronous motor with a flywheel of an exercise bicycle. FIG. 8B is a schematic view illustrating that shown in FIG. 8A with a sensor support removed. In the permanent-magnet synchronous motor driving and resistance control system 100c of the instant embodiment, constituent components are generally similar to those of the embodiment shown in FIGS. 1A and 1B, and a difference is that the instant embodiment further comprises at least one electricity generation winding 312. The electricity generation winding 312 is wound, together with the stator windings 311, around magnetic poles of the stator 31.

Figure 9:
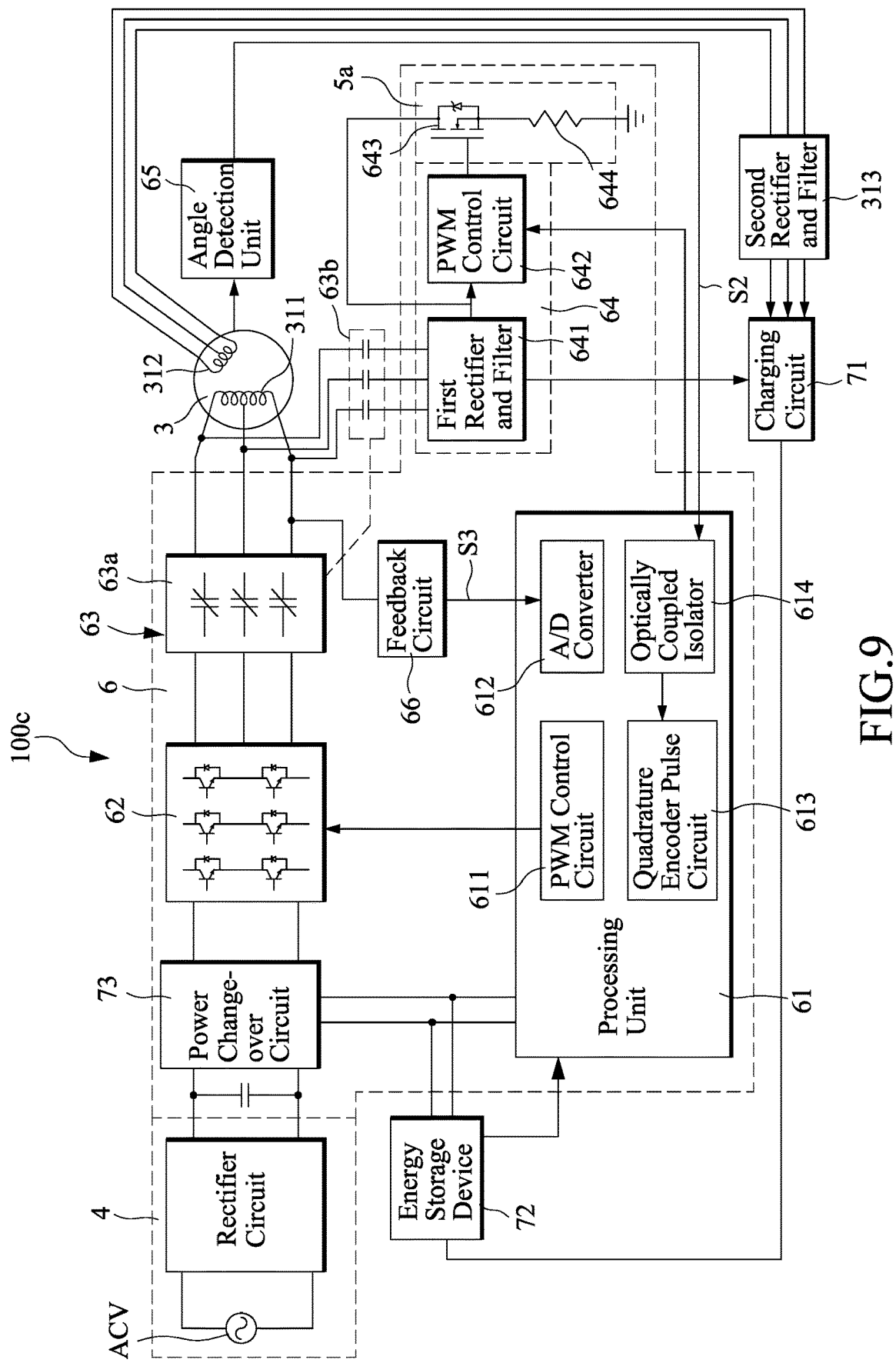
FIG. 9 is a circuit diagram of a fourth embodiment according to the present invention for use with the implementing example shown in FIG. 8A or 8B.

FIG. 9 is a circuit diagram of a fourth embodiment according to the present invention for use with the implementing example shown in FIG. 8A or 8B. In the permanent-magnet synchronous motor driving and resistance control system 100c of the instant embodiment, a circuit diagram is similar to the circuit diagram of the embodiment shown in FIG. 4. As shown in the drawing, in addition to the stator windings 311 being connected through the first rectifier and filter circuit 641 of the resistance controller 64 to the charging circuit 71, the electricity generation winding 312 is also connected through a second rectifier and filter circuit 313 to the charging circuit 71.

Thus, when the permanent-magnet synchronous motor 3 is operating in the first operation mode (namely, the generator mode), the electricity generation winding 312 simultaneously generates a backward charging voltage that is fed through the second rectifier and filter circuit 313 to the charging circuit 71, and the charging circuit 71 then generates backward charging electrical energy supplied to the energy storage device 72. Meanwhile, the generation voltage generated by the stator windings 311 of the permanent-magnet synchronous motor 3 is fed through the first rectifier and filter circuit 641 to also supply to the charging circuit 71 to generate backward charging electrical energy for supplying to the energy storage device 72.

When the interlock switch 63 makes the motor driving circuit 62 and the stator windings 311 of the permanent-magnet synchronous motor 3 closed-circuiting and makes the resistance controller 64 and the stator windings 311 of the permanent-magnet synchronous motor 3 open-circuiting, the energy storage device 72 supplies operation electrical energy through the motor driving circuit 62 to the permanent-magnet synchronous motor 3, making the permanent-magnet synchronous motor 3 operating in the second operation mode (namely the motor mode) to induce an acceleration on the external rotor 32.

Further, a power changeover circuit 73 may be connected with the energy storage device 72 and the power supply circuit 4 to selectively switch from the energy storage device 72 or the alternate-current power supply (ACV) to the permanent-magnet synchronous motor 3 for supply of electrical energy.

When the permanent-magnet synchronous motor 3 operates in the second operation mode, the electricity generation winding 312 similarly generates a backward charging voltage that is fed through the second rectifier and filter circuit 313 to the charging circuit 71, and the charging circuit 71 then generates backward charging electrical energy supplied to the energy storage device 72 to implement charging and energy accumulation in the energy storage device 72.

Further, the PWM control circuit 642 of the instant embodiment is connected with a resistance generation device 5a. Preferably, the resistance generation device 5a includes a discharge power element 643 and a discharge resistor 644 serially connected to the discharge power element 643. The PWM control circuit 642 generates a PWM control signal according to a DC voltage generated by the first rectifier and filter circuit 641 to control operation of the discharge power element 643, so that the DC voltage provided from the first rectifier and filter circuit 641 is applied through the discharge resistor 644 to generate an enlarged current to thereby change a resisting force applied to the flywheel 2.

Figure 10:
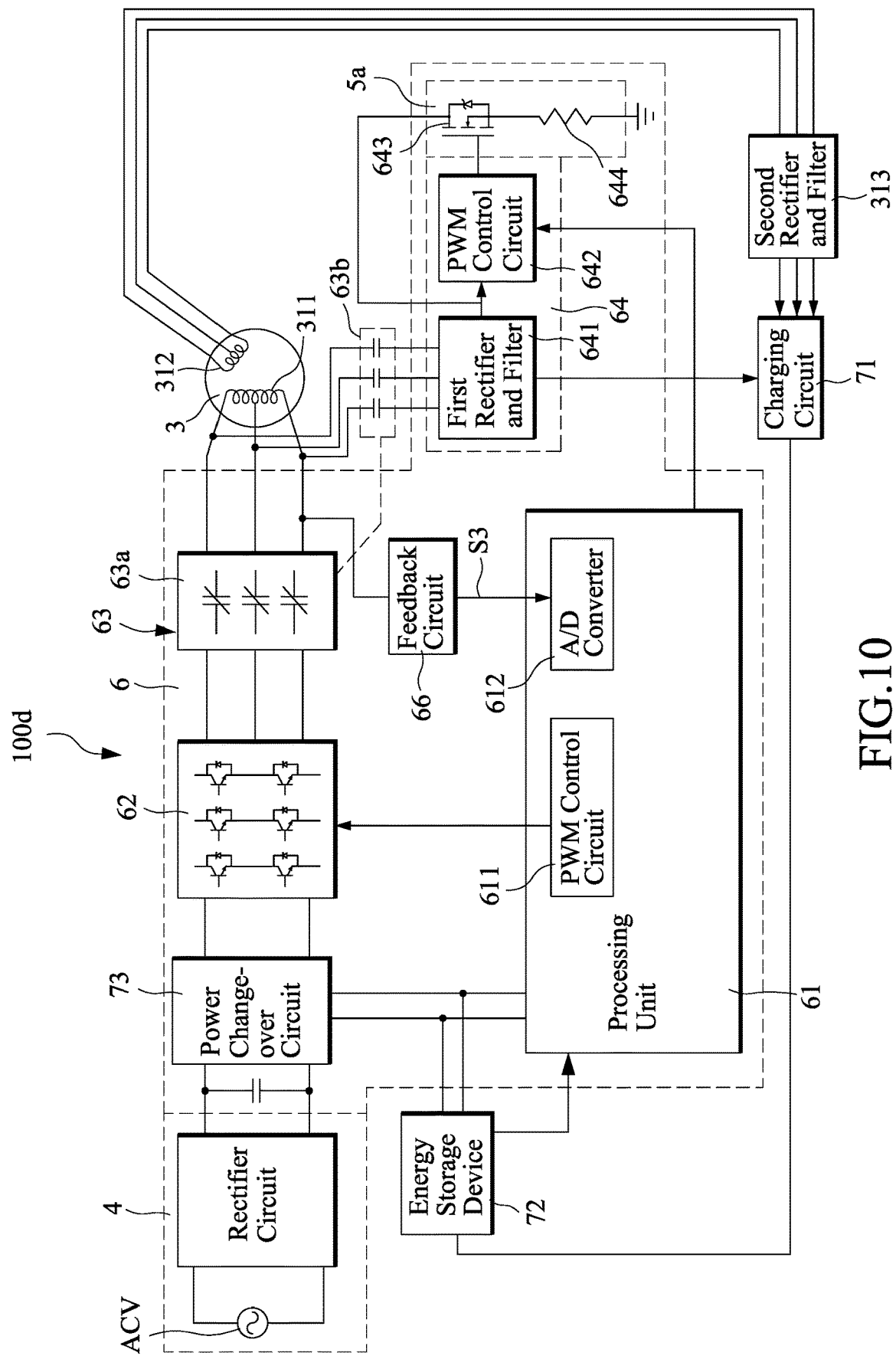
FIG. 10 is a circuit diagram of a fifth embodiment according to the present invention for use with the implementing example shown in FIG. 8A or 8B.

Referring to FIG. 10, which is a circuit diagram of a fifth embodiment according to the present invention for use with the implementing example shown in FIG. 8A or 8B. In the permanent-magnet synchronous motor driving and resistance control system 100d of the instant embodiment, a circuit diagram is similar to the circuit diagram of the embodiment shown in FIG. 9, but does not include an angle detection unit 65, and also, the processing unit 61 does not include a quadrature encoder pulse circuit 613 and an optically coupled isolator 614.

Optionally, the first switch 63a and the second switch 63b of the interlock switch 63 in the various embodiments as shown in the circuit diagrams of FIGS. 2, 3, 4, 9 and 10 may be removed and replaced by an interlock control performed by a controller or a processing unit.

Figure 11:
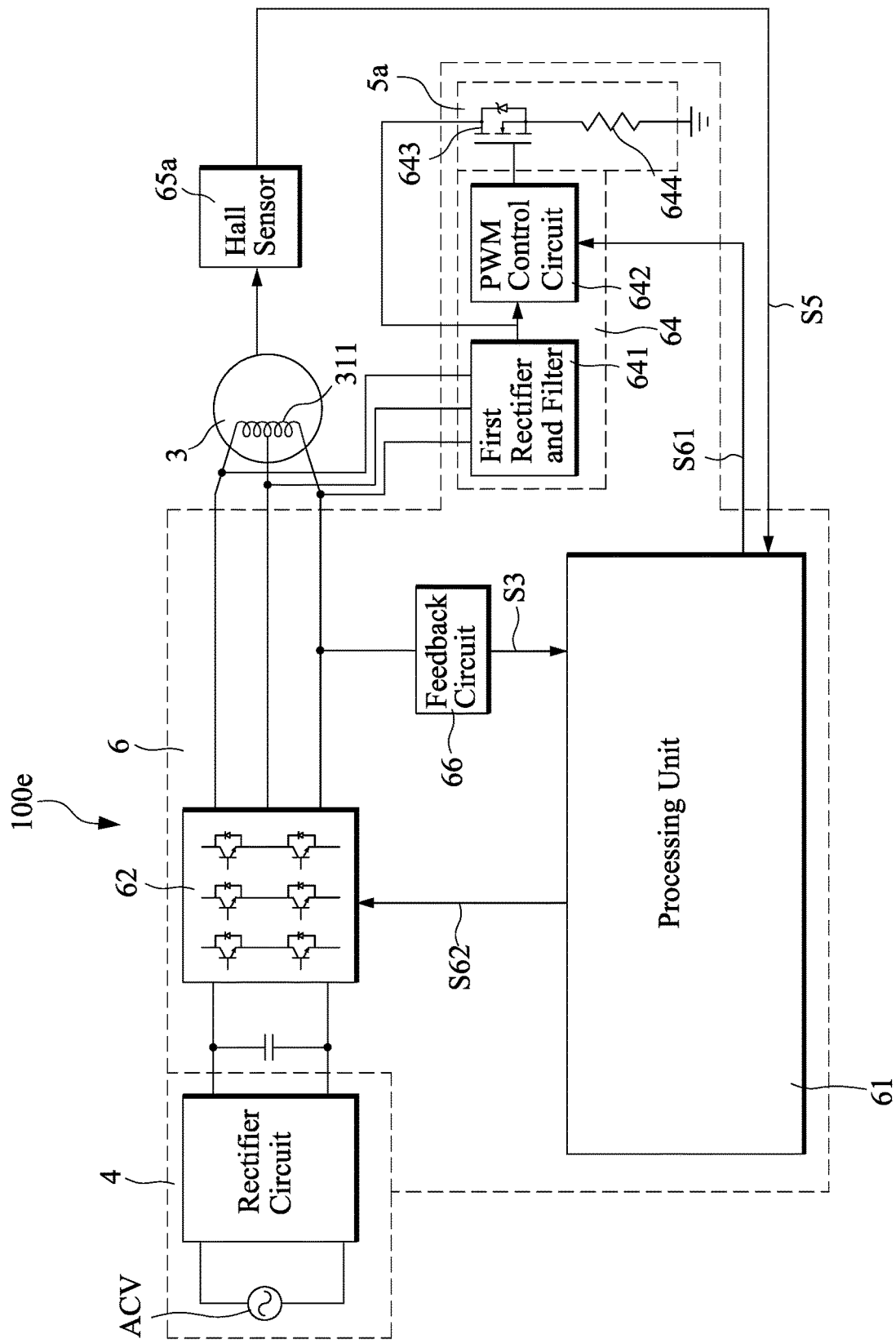
FIG. 11 is a circuit diagram of a sixth embodiment according to the present invention.

For example, FIG. 11 shows a circuit diagram of a sixth embodiment according to the present invention. In the permanent-magnet synchronous motor driving and resistance control system 100e of the instant embodiment, constituent components are generally similar to those of the first embodiment as shown in FIG. 2, so that, for consistency purpose, identical elements are designated with the same reference numerals.

In the instant embodiment, the first switch 63a and the second switch 63b of the first embodiment are removed, so that the motor driving circuit 62 is connected to the stator windings 311 of the permanent-magnet synchronous motor 3 and the resistance controller 64 is also connected to the stator windings 311 without the first switch 63a and the second switch 63b.

Besides, in the instant embodiment, the electromagnetic resistance generation device 5 of the first embodiment is replaced with a resistance generation device 5a which includes a discharge power element 643 and a discharge resistor 644.

Further, a hall sensor 65a is used to detect the rotation speed or the rotor angular position of the external rotor 32 of the permanent-magnet synchronous motor 3 and correspondingly generates a rotation signal S5 to the processing unit 61 of the control device 6.

In the uphill simulation mode (a first operation mode), under the interlock control of the control device 61, the processing unit 61 of the control device 6 generates a first PWM control signal S61 to the PWM control circuit 642 of the resistance controller 64 to control the discharge power element 643, while disables sending of a second PWM control signal S62 to the motor driving circuit 62. Under such an operation mode, the external rotor 32 of the permanent-magnet synchronous motor 3 is rotated by a cycling motion generated by the operator pedaling the flywheel 2 to move, so that the permanent-magnet synchronous motor 3 is operating in a generator mode to generate an AC generation voltage at the stator winding 311. The generation voltage is fed to the resistance controller 64 and converted into a DC voltage by means of the first rectifier and filter circuit 641, and then the DC voltage is applied through the discharge resistor 644 to generate an enlarged current to thereby change a resisting force applied to the flywheel 2. Thus, a virtual reality feeling of simulating an uphill motion is generated.

In the downhill simulation mode (a second operation mode), under the interlock control of the control device 61, the processing unit 61 of the control device 6 generates a second PWM control signal S62 to the motor driving circuit 62 to control the motor driving circuit 62, while disables sending of the first PWM control signal S61 to the PWM control circuit 642. Under such an operation mode, the electrical energy is supplied from the power supply circuit 4, and the motor driving circuit 62 supplies a driving current for the permanent-magnet synchronous motor 3 under control of the second PWM control signal S62, so that the permanent-magnet synchronous motor 3 is operating in a motor mode to generate an acceleration on the external rotor 32. Thus, a virtual reality feeling of simulating a downhill motion is generated.

Figure 12A:
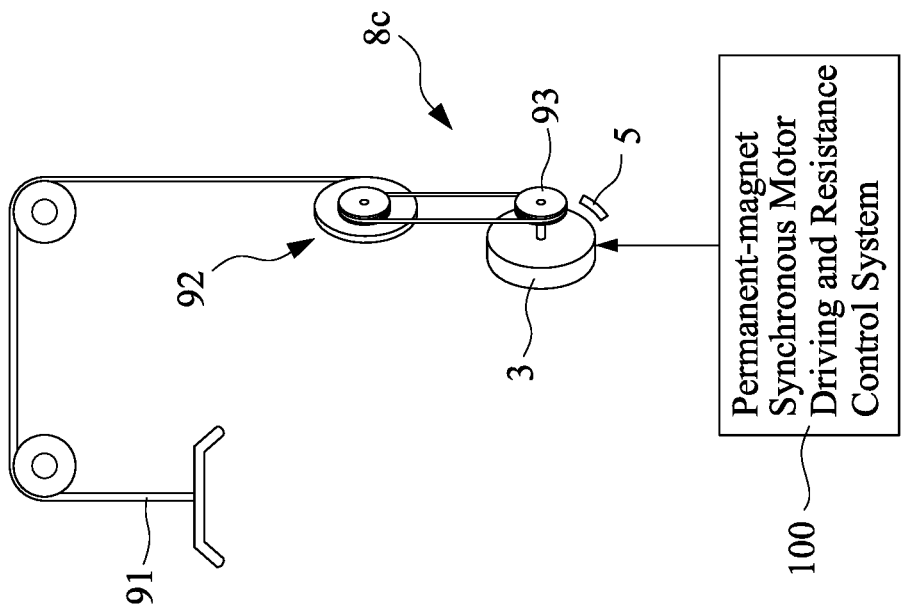
FIG. 12A is a schematic view illustrating an application in which the present invention is used to simulate a strength training machine, incorporating with an electromagnetic resistance generation device.
Figure 12B:
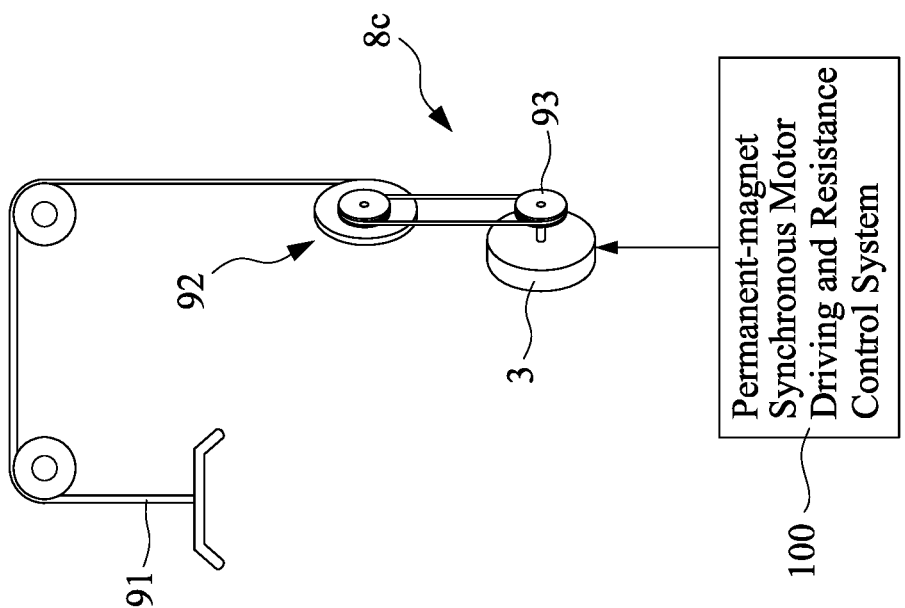
FIG. 12B is a schematic view illustrating an application in which the present invention is used to simulate a strength training machine, incorporating with a resistance generation device.

FIG. 12A is a schematic view illustrating an application in which the present invention is used to simulate a strength training machine, incorporating with an electromagnetic resistance generation device 5. FIG. 12B is a schematic view illustrating an application in which the present invention is used to simulate a strength training machine, incorporating with a resistance generation device 5a. The strength training machine 8c comprises a pull cord 91, a pulley assembly 92, a motor coupling pulley 93, and a permanent-magnet synchronous motor 3. The motor coupling pulley 93 is coupled to the rotation shaft of the permanent-magnet synchronous motor 3. An end of the pull cord 91 is attached to the motor coupling pulley 93 and the other end thereof is extended through the pulley assembly 92. The permanent-magnet synchronous motor 3 is functioned as weight parts of the conventional strength training machine in this application.

When a user downward pulls the pull cord 91 of the muscle strength training machine 8c, the permanent-magnet synchronous motor 3 is driven to rotate by means of the rotation of the motor coupling pulley 93. Under the control of the driving and resistance control system 100 (or 100a to 100e) according to the present invention, the permanent-magnet synchronous motor 3 is operating in a generator mode. Under such an operation mode, a resisting force is applied to the motor coupling pulley 93 and therefore the user feels the resisting force during the operation of pulling the pull cored 91.

When the user stops pulling the pull cord 91, electrical energy supplied from an AC power supply (ACV) or an energy storage device is supplied to the permanent-magnet synchronous motor 3, so that the permanent-magnet synchronous motor 3 is operating in a motor mode to generate an acceleration on the motor coupling pulley 93. Thus, a simulated weight training motion to the user is generated.

The embodiments described above are provided only for illustrating the present invention and are not intended to limit the scope of the present invention as defined in the appended claims. Equivalent modifications or substitutes that are accomplished without departing from the spirit disclosed in the present invention are considered included in the scope of the appended claims.

What is claimed is:

1. A driving and resistance control system for driving a permanent-magnet synchronous motor or applying a resisting force to the permanent-magnet synchronous motor, the permanent-magnet synchronous motor comprising a stator and an external rotor, wherein the stator includes a plurality of stator windings, and the external rotor is provided with a plurality of permanent magnet units circumferentially arranged therearound, and the external rotor is combinable with a flywheel of an exercise equipment, comprising:
   a power supply circuit for supplying an electrical energy;
   a resistance generation device for generating a resisting force to the flywheel of the exercise equipment, the resistance generation device being provided with a discharge power element and a discharge resistor serially connected to the discharge power element;
   a control device, comprising:
      a processing unit;
      a motor driving circuit electrically connected with the power supply circuit and the plurality of stator windings of the permanent-magnet synchronous motor to drive the permanent-magnet synchronous motor;
      a resistance controller connected between the plurality of stator windings of the permanent-magnet synchronous motor and the resistance generation device, the resistance controller being provided with a first rectifier and filter and a PWM control circuit connected between the first rectifier and filter and the discharge power element of the resistance generation device; and an interlock control to the motor driving circuit and the PWM control circuit of the resistance controller;

wherein in a first operation mode, under control of the interlock control of the control device, the processing unit generates a first PWM control signal to the PWM control circuit of the resistance controller to control the discharge power element, while disables sending of a second PWM control signal to the motor driving circuit, and under such an operation mode, the external rotor of the permanent-magnet synchronous motor is rotated by an operator applying a force to cause spinning of the flywheel, so that the permanent-magnet synchronous motor is operating in a generator mode to generate an AC generation voltage at the plurality of stator windings, wherein the generation voltage is fed to the resistance controller and converted into a DC voltage by means of the first rectifier and filter circuit, and then the DC voltage is applied through the discharge resistor to generate an enlarged current to thereby change a resisting force applied to the flywheel; and in a second operation mode, under control of the interlock control of the control device, the processing unit of the control device generates the second PWM control signal to the motor driving circuit to control the motor driving circuit, while disables sending of the first PWM control signal to the PWM control circuit 642, and under such an operation mode, the electrical energy is supplied from the power supply circuit, and the motor driving circuit supplies a driving current for the permanent-magnet synchronous motor under control of the second PWM control signal, so that the permanent-magnet synchronous motor is operating in a motor mode to generate an acceleration on the external rotor of the permanent-magnet synchronous motor.

2. The driving and resistance control system according to claim 1, wherein the control device further comprises a hall sensor for detecting an angle of a rotating spindle of the permanent-magnet synchronous motor and generating a rotation signal supplied to the control device.

3. The driving and resistance control system according to claim 1, wherein the control device further comprises a feedback circuit, and the feedback circuit comprises one of a current feedback circuit, a voltage feedback circuit, a Hall element, and a temperature element.

4. The driving and resistance control system according to claim 1, wherein the exercise equipment is combined with a chassis, and the chassis is connected to a lifting device, and the processing unit is operable to control the lifting device so as to control a slope of the chassis to thereby control the exercise equipment for an uphill or downhill motion.

5. The driving and resistance control system according to claim 1, wherein the stator of the permanent-magnet synchronous motor is further combined with a sensor support, and at least one stress sensor unit is mounted on the sensor support to measure torque-watt data of the operator applying a force to drive the flywheel.

6. A driving and resistance control system for driving a permanent-magnet synchronous motor or applying a resisting force to the permanent-magnet synchronous motor, the permanent-magnet synchronous motor comprising a stator and an external rotor, wherein the stator includes a plurality of stator windings, and the external rotor is provided with a plurality of permanent magnet units circumferentially arranged therearound, and the external rotor is combinable with a flywheel of an exercise equipment, comprising:

a power supply circuit for supplying an electrical energy;

an electromagnetic resistance generation device arranged adjacent to the external rotor of the permanent-magnet synchronous motor; and a control device, comprising:
  a processing unit;
  a motor driving circuit electrically connected with the power supply circuit and the plurality of stator windings of the permanent-magnet synchronous motor to drive the permanent-magnet synchronous motor;
  a resistance controller connected between the plurality of stator windings of the permanent-magnet synchronous motor and the electromagnetic resistance generation device; and
  an interlock switch connected with the motor driving circuit, the permanent-magnet synchronous motor, and the resistance controller;

wherein in a first operation mode, the interlock switch makes the motor driving circuit and the plurality of stator windings of the permanent-magnet synchronous motor open-circuiting, and makes the plurality of stator windings of the permanent-magnet synchronous motor connected to the resistance controller, and under such a condition, the external rotor of the permanent-magnet synchronous motor is caused to rotate by an operator applying a force to cause spinning of the flywheel, so that the permanent-magnet synchronous motor is operating in a generator mode to make the plurality of stator windings generate a generation voltage fed to the resistance controller, and the resistance controller changes an electromagnetic field intensity of the electromagnetic resistance generation device according to a pulse width modulation (PWM) control signal so as to change a magnitude of a resisting force acting on the flywheel; and in a second operation mode, the interlock switch makes the motor driving circuit and the plurality of stator windings of the permanent-magnet synchronous motor closed-circuiting, and cutting off control of the resistance controller, and the power supply circuit supplies electrical energy to the permanent-magnet synchronous motor through the motor driving circuit, so as to make the permanent-magnet synchronous motor operating in a motor mode to include an acceleration on the external rotor of the permanent-magnet synchronous motor.

7. The driving and resistance control system according to claim 6, wherein the resistance controller comprises:
  a first rectifier and filter circuit connected to the plurality of stator windings of the permanent-magnet synchronous motor to filter and rectify the generation voltage into a DC voltage; and
  a PWM control circuit electrically connected with the first rectifier and filter and the electromagnetic resistance generation device, and is operable to generate, according to the DC voltage, the PWM control signal to control the electromagnetic field intensity of the electromagnetic resistance generation device, so as to generate an eddy-current resisting force on the external rotor during rotation of the external rotor to thereby change the resisting force acting on the flywheel.

8. The driving and resistance control system according to claim 6, wherein the control device further comprises an angle detection unit for detecting an angle of a rotating spindle of the permanent-magnet synchronous motor and generates an angle signal supplied to the control device.

9. The driving and resistance control system according to claim 6, wherein the control device further comprises a feedback circuit, and the feedback circuit comprises one of a current feedback circuit, a voltage feedback circuit, a Hall element, and a temperature element.

10. The driving and resistance control system according to claim 6, wherein the resistance controller is further connected to a charging circuit to have the generation voltage that is generated by the plurality of stator windings of the permanent-magnet synchronous motor operating in the generator mode fed, after the first rectifier and filter circuit, through a charging circuit for backward charging into at least one energy storage device.

11. The driving and resistance control system according to claim 6, wherein the electromagnetic resistance generation device comprises at least one electrical magnet, which is arranged on an outer circumference of the external rotor.

12. The driving and resistance control system according to claim 6, wherein the power supply circuit comprises an alternate-current power supply, an energy storage device, or a combined power supply that includes an alternate-current power supply and an energy storage device.

13. The driving and resistance control system according to claim 6, wherein the exercise equipment is combined with a chassis, and the chassis is connected to a lifting device, and the processing unit is operable to control the lifting device so as to control a slope of the chassis to thereby control the exercise equipment for an uphill or downhill motion.

14. The driving and resistance control system according to claim 6, wherein the stator of the permanent-magnet synchronous motor is further combined with a sensor support, and at least one stress sensor unit is mounted on the sensor support to measure torque-watt data of the operator applying a force to drive the flywheel.

15. A driving and resistance control system for driving a permanent-magnet synchronous motor or applying a resisting force to the permanent-magnet synchronous motor, the permanent-magnet synchronous motor comprising a stator and an external rotor, wherein the stator includes a plurality of stator windings, and the external rotor is provided with a plurality of permanent magnet units circumferentially arranged therearound, and the external rotor is combinable with a flywheel of an exercise equipment, comprising:
an energy storage device;
a resistance generation device for generating a resisting force to the flywheel of the exercise equipment;
a control device, comprising:
a processing unit;
a motor driving circuit electrically connected with the energy storage device and the plurality of stator windings of the permanent-magnet synchronous motor to drive the permanent-magnet synchronous motor;
a resistance controller connected between the plurality of stator windings of the permanent-magnet synchronous motor and the resistance generation device; and
an interlock switch including a first switch and a second switch, the first switch being connected with the motor driving circuit and the plurality of stator windings of the permanent-magnet synchronous motor and the second switch being connected between the plurality of stator windings and the resistance controller;
at least one electricity generation winding wound onto the stator; and
a charging circuit connected to the at least one electricity generation winding through a second rectifier and filter circuit and connected to the plurality of stator windings through the resistance controller;

wherein in a first operation mode, the interlock switch makes the motor driving circuit and the plurality of stator windings of the permanent-magnet synchronous motor open-circuiting, and makes the plurality of stator windings of the permanent-magnet synchronous motor connected to the resistance controller, and under such a condition, the external rotor of the permanent-magnet synchronous motor is caused to rotate by an operator applying a force to cause spinning of the flywheel, so that the permanent-magnet synchronous motor is operating in a generator mode to make the plurality of stator windings generate a generation voltage fed to the resistance controller, and the resistance controller controls the resistance generation device to generate the resisting force to the flywheel according to a pulse width modulation (PWM) control signal;

wherein the generation voltage generated by the plurality of stator windings charges into the energy storage device through the resistance controller and the charging circuit during the first operation mode, and also a backward charging voltage generated by the at least one electricity generation winding charges into the energy storage device through the second rectifier and filter circuit and the charging circuit during the first operation mode;

wherein in a second operation mode, the interlock switch makes the motor driving circuit and the plurality of stator windings of the permanent-magnet synchronous motor closed-circuiting, and cutting off control of the resistance controller, and an electrical energy stored in the energy storage device is supplied to the permanent-magnet synchronous motor through the motor driving circuit, so as to make the permanent-magnet synchronous motor operating in a motor mode to drive the external rotor of the permanent-magnet synchronous motor; and wherein a backward charging voltage generated by the at least one electricity generation winding charges into the energy storage device through the second rectifier and filter circuit and the charging circuit during the second operation mode.

16. The driving and resistance control system according to claim 15, wherein the resistance controller comprises:
a first rectifier and filter circuit connected to the plurality of stator windings of the permanent-magnet synchronous motor to filter and rectify the generation voltage into a DC voltage; and
a PWM control circuit electrically connected with the first rectifier and filter and the resistance generation device, and is operable to generate, according to the DC voltage, the PWM control signal to control the resistance generation device to generate a resisting force to the flywheel.

17. The driving and resistance control system according to claim 15, wherein the control device further comprises an angle detection unit for detecting an angle of a rotating spindle of the permanent-magnet synchronous motor and generates an angle signal supplied to the control device.

18. The driving and resistance control system according to claim 15, wherein the control device further comprises a feedback circuit, and the feedback circuit comprises one of a current feedback circuit, a voltage feedback circuit, a Hall element, and a temperature element.

19. The driving and resistance control system according to claim 15, wherein the exercise equipment is combined with a chassis, and the chassis is connected to a lifting device, and the processing unit is operable to control the lifting device so as to control a slope of the chassis to thereby control the exercise equipment for an uphill or downhill motion.

20. The driving and resistance control system according to claim 15, wherein the stator of the permanent-magnet synchronous motor is further combined with a sensor support, and at least one stress sensor unit is mounted on the sensor support to measure torque-watt data of the operator applying a force to drive the flywheel.

* * * * *